United States Patent
Wright et al.

(10) Patent No.: US 10,344,927 B1
(45) Date of Patent: Jul. 9, 2019

(54) LIGHTING FIXTURE WITH MOTION SENSOR

(71) Applicant: Cooper Technologies Company, Houston, TX (US)

(72) Inventors: Timothy Glenn Wright, Peachtree City, GA (US); Nam Chin Cho, Peachtree City, GA (US); James Richard Christ, Peachtree City, GA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 15/638,113

(22) Filed: Jun. 29, 2017

Related U.S. Application Data

(60) Provisional application No. 62/357,686, filed on Jul. 1, 2016.

(51) Int. Cl.
| | |
|---|---|
| F21S 8/00 | (2006.01) |
| F21V 23/00 | (2015.01) |
| F21V 23/04 | (2006.01) |
| F21V 33/00 | (2006.01) |
| G08B 13/19 | (2006.01) |
| F21W 131/103 | (2006.01) |

(52) U.S. Cl.
CPC .......... *F21S 8/033* (2013.01); *F21V 23/0442* (2013.01); *G08B 13/19* (2013.01); *F21V 23/00* (2013.01); *F21V 33/00* (2013.01); *F21W 2131/103* (2013.01)

(58) Field of Classification Search
CPC ....... F21S 8/099; F21V 23/0442; G08B 13/19

USPC ......................................................... 362/276
See application file for complete search history.

(56) References Cited

U.S. PATENT DOCUMENTS

| | | | | |
|---|---|---|---|---|
| 4,970,494 A * | 11/1990 | Keely | ............... | G08B 13/19 250/342 |
| 5,165,465 A * | 11/1992 | Kenet | ............... | G08B 13/19 165/11.1 |
| 5,971,597 A * | 10/1999 | Baldwin | ............... | G01K 1/16 340/540 |
| 7,106,193 B2 * | 9/2006 | Kovach | ............... | G08B 25/00 340/426.1 |
| 7,250,861 B2 * | 7/2007 | Yukawa | ............... | G08B 15/00 315/133 |
| 8,350,667 B2 * | 1/2013 | Ferstl | ............... | H05B 37/0272 340/5.2 |
| 2003/0083036 A1 * | 5/2003 | Liu | ............... | H03G 1/0088 455/343.1 |

(Continued)

OTHER PUBLICATIONS

LumaWatt Outdoor Wireless Control and Monitoring System; Brochure; Jun. 2015.

*Primary Examiner* — Bryon T Gyllstrom
(74) *Attorney, Agent, or Firm* — King & Spalding LLP

(57) ABSTRACT

A lighting fixture includes a lighting device, a motion sensor, and a wireless transceiver configured to transmit and receive wireless signals. The lighting fixture further includes a controller communicably coupled to the lighting device, to the motion sensor, and to the transceiver. The controller is configured to adjust a light provided by the lighting device based on a motion detection by the motion sensor and based on a wireless input signal received by the transceiver indicating whether a second motion is detected by a second lighting fixture.

17 Claims, 5 Drawing Sheets

(56) References Cited

U.S. PATENT DOCUMENTS

| | | | |
|---|---|---|---|
| 2004/0036603 A1* | 2/2004 | Bingham | G08B 13/19628 340/541 |
| 2004/0140430 A1* | 7/2004 | Micko | G08B 13/19 250/342 |
| 2006/0111793 A1* | 5/2006 | Stokes | G05B 15/02 700/3 |
| 2007/0121323 A1* | 5/2007 | Pawlik | H05B 37/0272 362/253 |
| 2010/0106306 A1* | 4/2010 | Simon | H05B 33/0803 700/276 |

\* cited by examiner

LIGHTING FIXTURE WITH MOTION SENSOR

CROSS REFERENCE TO RELATED APPLICATIONS

The present application claims priority under 35 U.S.C. Section 119(e) to U.S. Provisional Patent Application No. 62/357,686, filed Jul. 1, 2016 and titled "Lighting Fixture With Motion Sensor," the entire content of which is incorporated herein by reference.

TECHNICAL FIELD

The present disclosure relates generally to lighting solutions, and more particularly to lighting fixtures with motion sensors that control lighting based on motion detected by other motion sensors and/or received beacon signals.

BACKGROUND

Lighting fixtures are often powered on and off manually to control illumination of an area by light from the lighting fixtures. In some cases, lighting fixtures include a motion sensor (e.g., a Passive Infrared (PIR) motion sensor) to control illumination of an area based on detection of motion by the motion sensor. To illustrate, a PIR sensor uses passive infrared to monitor motion in an area, for example, that is under or in front of a lighting fixture. Once a motion is detected by the PIR sensor, the PIR sensor may send a signal to power on the light source of the lighting fixture to emit a light or to increase the brightness level of the light emitted by the lighting fixture. In some cases, a motion sensor such as a PIR sensor may have a more limited coverage area for detecting motion than desirable. For example, when a PIR sensor is mounted on a pole (e.g., at a height of 20 feet or higher) of an outdoor lighting fixture, the detection coverage area of the PIR sensor may be too small to timely detect a car's motion. To illustrate, a moving car may move past an outdoor lighting fixture by the time the lighting fixture illuminates an area near the lighting fixture based on detection of the automobile's motion by the PIR sensor of the lighting fixture. Thus, a solution that provides improved illumination based on motion detection is desirable.

SUMMARY

The present disclosure relates generally to lighting solutions, and more particularly to lighting fixtures with motion sensors that control lighting based on motion detected by other motion sensors and/or received beacon signals. In an example embodiment, a lighting fixture includes a lighting device, a motion sensor, and a wireless transceiver configured to transmit and receive wireless signals. The lighting fixture further includes a controller communicably coupled to the lighting device, to the motion sensor, and to the transceiver. The controller is configured to adjust a light provided by the lighting device based on motion detection by the motion sensor and based on a wireless input signal received by the transceiver indicating whether a second motion is detected by a second lighting fixture.

In another example embodiment, a lighting network includes a first lighting fixture configured to detect a motion and to start emitting a first light or change an intensity level of the first light in response to detecting the motion. The first lighting fixture is configured to transmit a wireless signal indicating the detecting of the motion by the first lighting fixture. The lighting network further includes a second lighting fixture located inside a range of the wireless signal. The second lighting fixture is configured to start emitting a second light or change an intensity level of the second light in response to receiving the wireless signal.

In another example embodiment, a method of controlling lighting includes detecting a motion by a motion sensor of a lighting fixture and receiving an input wireless signal by the lighting fixture. The method further includes adjusting a light provided by the lighting fixture based on the detecting of the motion and the input wireless signal.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

Figure 1:
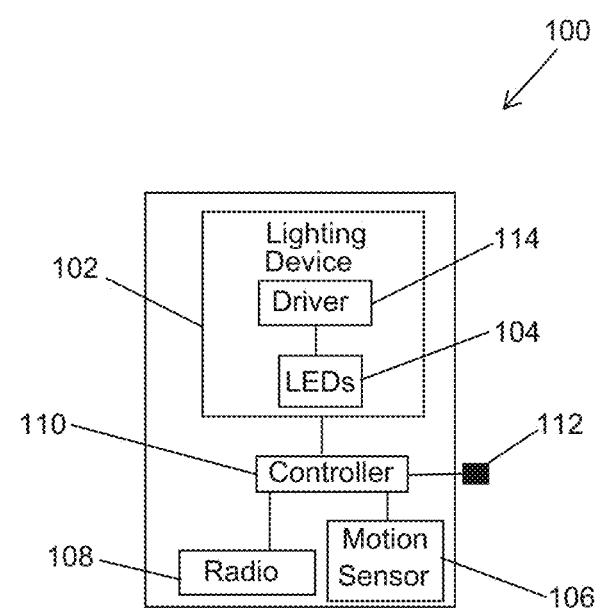
FIG. 1 illustrates a lighting fixture with motion sensing according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a first sensor-controlled lighting fixture that includes a PIR motion sensor or another type(s) of motion/occupancy sensing device (e.g., radar, ultrasonic, digital camera, etc.) can transmit a wireless output signal (e.g., a Bluetooth or another radiofrequency signal) to other sensor-controlled lighting fixtures to indicate a detection of a motion by the first lighting fixture (i.e., by the motion sensor of the first lighting fixture). The first lighting fixture may also turn on its own light or increase the intensity level of the light in response to the detection of the motion by its sensor. Other sensor-controlled lighting fixtures that are within the range of the wireless output signal can turn on their lights or increase the intensity level of their lights in response to receiving the wireless output signal. The power level of the wireless output signal may be adjusted to increase or decrease the range of the wireless output signal, which may result in more or fewer other sensor-controlled lighting fixtures adjusting their lights in response to the wireless signal. As a person or an object moves toward a second sensor-controlled lighting fixture, the second sensor-controlled lighting fixture can detect the motion of the person/object and can transmit another wireless output signal (e.g., a Bluetooth or another radiofrequency signal) to other lighting fixtures. Lighting fixtures that are within the range of the wireless output signal transmitted by the second lighting fixture can turn on their lights or increase the intensity level of their lights in response to the wireless signal from the second lighting fixture. The power level of the wireless output signal transmitted by the second lighting fixture may be adjusted to increase or decrease the range of the wireless output signal, which may result in more or fewer other sensor-controlled lighting fixtures adjusting their lights in response to the wireless signal. Other sensor-controlled lighting fixtures that are in a driving or walking path of the object/person can continue to operate in a similarly sequential manner as the first and second lighting fixtures by transmitting wireless signals to other sensor-controlled lighting fixtures, which may result in the driving/walking path of an object/person being illuminated ahead of the object/person.

Turning now to the figures, particular example embodiments are described. FIG. 1 illustrates a lighting fixture 100 with motion sensing according to an example embodiment. The lighting fixture 100 includes a lighting device 102, the motion sensor 106, a radio component 108 (e.g., a wireless transceiver), and a controller 110.

The lighting device 102 includes an LED light source 104 and a driver 114 that provides power to the LED light source 104. The LED light source 104 may include one or more discrete LEDs, one or more organic light-emitting diodes (OLEDs), an LED chip on board that includes one or more discrete LEDs, and/or an array of discrete LEDs. In some example embodiments, the lighting device 102 may include one or more light sources that are not LED light sources in addition to or other than the LED light source 104.

In some example embodiments, the motion sensor 106 can detect a motion resulting from a movement of, for example, an object or a person. For example, the motion sensor 106 may be a PIR motion sensor or another type of motion/occupancy sensor. The motion sensor 106 may provide an electrical signal to the controller 110 to indicate a detection of a motion by the sensor 106, for example, via a connection such as an electrical wire(s).

In some example embodiments, the radio component 108 can transmit and receive wireless signals (e.g., Bluetooth and/or other radiofrequency signals) to and from the lighting fixture 100. To illustrate, the radio component 108 may receive wireless signals and provide the signals to the controller 110 via a connection such as an electrical wire(s). The radio component 108 may also receive electrical signals from the controller 110 and wirelessly transmit the signals.

In some example embodiments, the controller 110 may be coupled to the lighting device 102 and may control the lighting device 102 to control the light emitted by the LED light source 104. For example, the controller 110 may control the driver 114 to control the power provided to the LED light source. The controller 110 may turn on and off power from the driver 114 to the LED light source 104 and/or may control the amount of power provided to the LED light source 104 by the driver 114.

In some example embodiments, the intensity level of the light emitted by the LED light source 104 may be adjusted by adjusting the power provided to the LED light source 104 by the driver 114. To illustrate, the power provided to the LED light source 104 by the driver 114 may be increased to increase the intensity level of the light, and the power provided to the LED light source 104 by the driver 114 may be decreased to decrease the intensity level of the light. For example, the driver 114 may adjust the current that the driver 114 provides to the LED light source 104 based on a control signal provided to the driver 114 by the controller 110.

In some example embodiments, the LED light source 104 may start emitting a light in response to a detection of a motion by the motion sensor 106. For example, upon detecting a motion, the motion sensor 106 may provide an indication signal to the controller 110 of the detection. In turn, the controller 110 may provide a control signal to the lighting device 102 to start emitting a light. To illustrate, the controller 110 may provide a control signal to the driver 114 to provide power or to increase the power provided to the LED light source 104. Alternatively, upon receiving the motion detection indication signal from the motion sensor 106, the controller 110 may provide the control signal to another component (e.g., a transistor switch) electrically coupled to the driver to provide power or to increase the power provided to the LED light source 104.

In some example embodiments, upon receiving the motion detection indication signal from the motion sensor 106, the controller 110 may transmit a signal to indicate the detection of the motion by the motion sensor 106 to other lighting fixtures. To illustrate, the radio component 108 may receive from the controller 110 an electrical signal indicating the detection of the motion by the motion sensor 106 and wirelessly transmit the signal as a wireless output signal. The wireless output signal transmitted by the radio component 108 may also include an identification string (e.g., a particular digital pattern). For example, the signal provided to the radio component 108 by the controller 110 may already include the identification string. To illustrate, the identification string may be stored in a memory device of the lighting fixture 100 (e.g., a memory device of the controller 110), and the controller 110 may obtain the identification string from the memory device.

In some example embodiments, the identification string may indicate that the wireless output signal is transmitted by a lighting fixture that is in a particular network (e.g., a lighting network, a motion detection network, etc.). The identification string may allow a receiving lighting fixture (e.g., another instance of the lighting fixture 100) to determine whether the receiving lighting fixture should take action in response to receiving the wireless output signal. As an example of one application, the identification string can be used to control which light fixtures in an array of light fixtures will respond to a wireless output signal emitted from a light fixture with a motion detector that has detected motion. For example, the identification string can be used to turn on light fixtures in a parking garage, but not in a neighboring parking garage with light fixtures that are not programmed with the particular identification string.

In some example embodiments, the radio component 108 may receive a wireless input signal that indicates a detection of a motion by another lighting fixture (e.g., another instance of the lighting fixture 100), and the radio component 108 may provide a corresponding electrical signal to the controller 110 via a connection (e.g., one or more electrical wires). The controller 110 may determine whether the received wireless input signal includes a valid identification string. For example, a received identification string in the wireless input signal may be considered valid if the received identification string is the same as the identification string included in the wireless signal transmitted by the radio component 110. Alternatively, the received identification string may be considered as valid if the received identification string matches a different matches a different string.

Upon determining that the identification string in the received wireless signal is valid, the controller 110 may provide a control signal to the lighting device 102 to start emitting a light or to increase the intensity level of the light emitted by the LED lighting source 104. For example, the controller 110 may provide the control signal to the driver 114 so that the driver 114 provides power or increases the power provided to the LED light source 104. Alternatively, the controller 110 may provide the control signal to another component (e.g., a transistor switch) electrically coupled to the driver 114 so that power to the LED light source 104 is provided or increased by the driver 114.

In some example embodiments, an identification string that is included in the transmitted wireless signal and/or used in determining the validity of a string included in a received wireless signal may be set or programmed using a wireless configuration process at the time of installation of the lighting fixture 100 or after installation. For example, the lighting fixture 100 may be wirelessly programmed with an identification string via the radio component 108 that provides the string to the controller 110. Alternatively, the lighting fixture 100 may be programmed with the identification string using a manual input interface 112 that is coupled to the controller 110.

In some example embodiments, the power level of the wireless signal transmitted by the lighting fixture 100 to indicate a detection of motion by the motion sensor 106 may be adjusted to increase or decrease the range of the wireless signal. For example, the power level of the wireless output signal may be increased or decreased by the lighting fixture 100 based on a user input provided wirelessly via the radio component 108 or via the manual user interface 112 or another similar interface. To illustrate, the controller 110 may control the radio component 108 based on the user input provided to set/adjust the power level/range of the wireless output signal. Alternatively, the user input may be provided to the radio component from the user input interface.

In some example embodiments, the radio component 108 may also receive wireless signals, such as Bluetooth Low Energy (BLE) signals (e.g., a beacon signal), from mobile devices that are within a particular range of the lighting fixture 100. For example, a software application resident in a mobile device (e.g., a smart phone, a tablet, a transmitting device built in a car, etc.) may periodically and/or in response to a user input transmit a BLE beacon signal that indicates, for example, the presence of the mobile device, a light should be turned on, a light should be turned off, and/or intensity of a light should be adjusted (e.g., increased or decreased). The radio component 108 may receive the wireless signal from the mobile device and provide the information to the controller 110.

In some example embodiments, in response to the lighting fixture 100 receiving a BLE beacon signal (or another similar signal) from a mobile device, the controller 110 may provide a control signal to the lighting device 102 (e.g., the driver 114 of the lighting device 102) to control the light provided by the LED lighting source 104 depending on the BLE beacon signal. For example, the controller 110 may provide a control signal to the lighting device 102 to start emitting a light and/or to increase the intensity level of the light emitted by the LED lighting source 104. As another example, the controller 110 may provide a control signal to the lighting device 102 to decrease the intensity level of the light emitted by the LED lighting source 104. In some example embodiments, the controller 110 may first verify the validity of the BLE beacon signal prior to adjusting the light provided by the LED light source 104.

In some example embodiments, the controller 110 may turn off the light or decrease the intensity level of the light emitted by the LED light source 104 after a time out period following the latter of a latest detection of a motion by the motion sensor 106 and a latest reception of an input wireless signal that indicates a detection of a motion by another lighting fixture or motion sensor. In some alternative embodiments, the controller 110 may turn off the light or decrease the intensity level of the light emitted by the LED light source 104 based on another condition without departing from the scope of this disclosure.

By transmitting the wireless output signal to other lighting fixtures and by controlling the lighting of the lighting fixture 100 based on the received wireless input signal, the lighting fixture 100 enables improved illumination to be provided, where, for example, a walking/driving path is illuminated ahead of a moving person/object.

In some alternative embodiments, some of the functions of two or more of the components of the lighting fixture 100 may be performed by a single component or a different component than described without departing from the scope of this disclosure. In some example embodiments, some of the functions described above may be performed by hardware, software, or a combination thereof. In some alternative embodiments, some of the components of the lighting fixture 100 may be omitted without departing from the scope of this disclosure.

Figure 2:
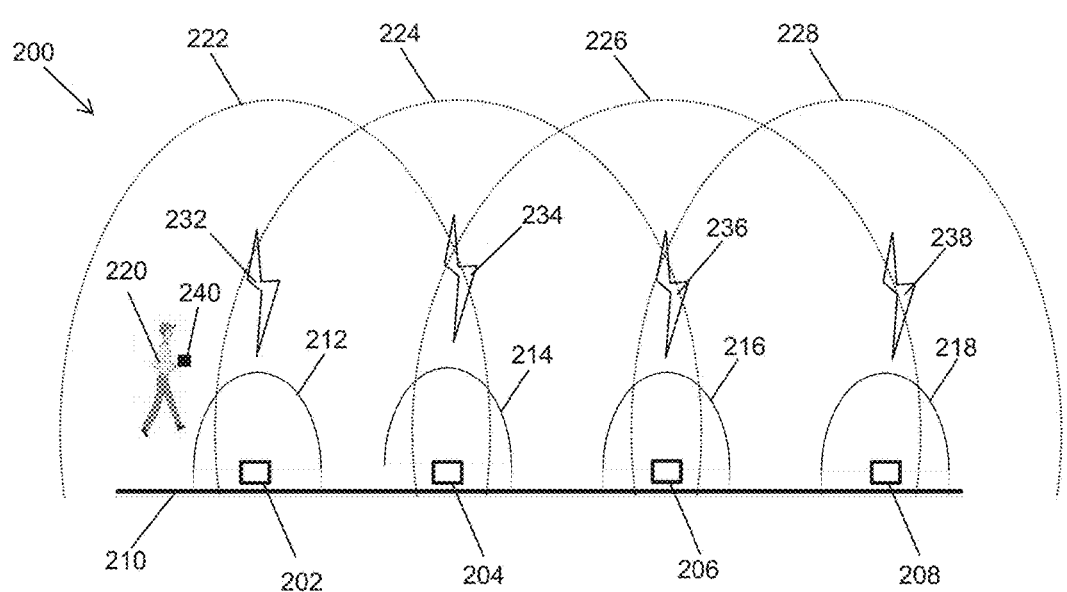
FIG. 2 illustrates a network of lighting fixtures according to an example embodiment.

FIG. 2 illustrates a network 200 of lighting fixtures according to an example embodiment. In some example embodiments, the system 200 includes lighting fixtures 202-208. For example, each of the lighting fixtures 202-208 may be an instance of the lighting fixture 100 of FIG. 1. The lighting fixtures 202-208 may be installed on a structure 210 such as a wall. The lighting fixture 202 has a motion detection coverage area generally bound by a boundary line 212. For example, the lighting fixture 202 may detect a motion of a person that moves within the boundary line 212. The lighting fixture 204 has a motion detection coverage area generally bound by a boundary line 214. The lighting fixture 206 has a motion detection coverage area generally bound by a boundary line 216. The lighting fixture 208 has a motion detection coverage area generally bound by a boundary line 218. Each lighting fixture 202-208 may transmit a wireless output signal that indicates motion detection by the lighting fixture in a similar manner as described with respect to the lighting fixture 100 of FIG. 1. The lighting fixture 202 may transmit a wireless output signal 232 that has a range generally limited to a boundary line 222. The lighting fixture 204 may transmit a wireless output signal 234 that has a range generally limited to a boundary line 224. The lighting fixture 206 may transmit a wireless output signal 236 that has a range generally limited to a boundary line 226. The lighting fixture 208 may transmit a wireless output signal 238 that has a range generally limited to a boundary line 228.

As illustrated in FIG. 2, the lighting fixture 202 is inside the range 224 of the wireless signal 234 transmitted by the lighting fixture 204. The lighting fixture 204 is inside the range 222 of the wireless signal 232 transmitted by the lighting fixture 202 and inside the range 226 of the wireless signal 236 transmitted by the lighting fixture 206. The lighting fixture 206 is inside the range 224 of the wireless signal 234 transmitted by the lighting fixture 204 and inside the range 228 of the wireless signal 238 transmitted by the lighting fixture 208. The lighting fixture 208 is inside the range 226 of the wireless signal 236 transmitted by the lighting fixture 226.

During operation, when a person 220 walks toward the lighting fixture 202 and reaches the motion detection coverage area of the lighting fixture 202, the lighting fixture 202 may start emitting a light or may increase the intensity level of the light emitted by lighting fixture 202. Upon the motion sensor of the lighting fixture 202 detecting the movement of the person 220, the lighting fixture 202 may transmit the wireless output signal 232 to indicate the detection of the motion. When the lighting fixture 204 receives the wireless output signal 232, the lighting fixture 204 may start emitting a light or increase an intensity level of the light emitted by lighting fixture 204 in response to the wireless output signal 232. In some example embodiments, the lighting fixture 204 may check whether the wireless signal 232 includes a valid identification string in a similar manner as described above before adjusting the light emitted by the lighting fixture 204 in response to receiving the wireless output signal 232.

In some example embodiments, all lighting fixtures 202-208 use the same identification string in the respective wireless output signals and to check for validity of a received identification string. For example, the same identification string may serve as a motion detection network identifier for lighting fixtures that are on the same motion detection network.

When the person 220 reaches the motion detection coverage area of the lighting fixture 204, the lighting fixture 204 may transmit the wireless output signal 234 to indicate the detection of the motion by the lighting fixture 204. Upon receiving the wireless output signal 234, the lighting fixture 202 may turn on or increase an intensity level of the light emitted by the lighting fixture 202 if the light emitted by the lighting fixture 202 was off or at low intensity level. Upon receiving the wireless output signal 234, the lighting fixture 206 may turn on or increase an intensity level of its light.

When the person 220 reaches the motion detection coverage area of the lighting fixture 206, the lighting fixture 206 may transmit the wireless output signal 236 to indicate the detection of the motion by the lighting fixture 206. Upon receiving the wireless output signal 236, the lighting fixture 204 may turn on or increase an intensity level of the light emitted by the lighting fixture 204 if the light emitted by the lighting fixture 204 was off or at low intensity level. Upon receiving the wireless output signal 236, the lighting fixture 208 may turn on or increase an intensity level of its light.

As the person 220 moves from left to right as shown in FIG. 2, the path in front of the person 220 may be illuminated before the person 220 reaches the detection coverage area of the motion sensor of the lighting fixture that is ahead of the person 220. For example, before the person 220 reaches the motion detection coverage area of the lighting fixture 204, the lighting fixture 204 may illuminate the area in front of the lighting fixture 204, thus providing improved illumination. Because the lighting fixture 206 is outside of the range of the wireless signal 232, illumination by the lighting fixture 206 may be delayed until the lighting fixture 204 detects the motion of the person 220 and transmits the wireless signal 234. By limiting the range of the wireless signal 232, illumination by the lighting fixture 206 may be delayed until desired. The path in front of the person 220 may be illuminated in a similar manner as the person walks towards the lighting fixture 208.

In some example embodiments, one or more of the ranges 222-228 may be increased or decreased by adjusting the power level of respective one or more of the wireless signals 232-238. For example, the range of the wireless signal 234 may be increased to reach the lighting fixture 208 such that both lighting fixtures 206, 208 start emitting or increase the intensity levels of their lights in response to receiving the wireless signal 234, which is transmitted by the lighting fixture 204 upon the detection of the motion of the person 220 by the lighting fixture 204.

In some example embodiments, the lighting fixtures 202-208 may each adjust their respective lights based on a BLE beacon signal (or another similar signal) provided by a mobile device, such as a mobile device 240. For example, when the person 220 carrying the mobile device 240 is within a distance from the lighting fixture 202 such that the lighting fixture 202 can successfully receive a BLE beacon signal transmitted by the mobile device 240, the lighting fixture 202 may adjust its light based on the particular BLE beacon signal. For example, the lighting fixture 202 may turn on, turn off, or adjust intensity of its light in response to receiving the BLE beacon signal. For example, a particular BLE beacon signal may correspond to turning on a light, another BLE beacon signal may correspond to increasing intensity of a light, etc. As the person 220 walks toward the lighting fixture 204 and reaches within a distance of the lighting fixture 204 such that the lighting fixture 204 can successfully receive the BLE beacon signal, the lighting fixture 204 may also adjust its light in a similar manner as described with respect to the lighting fixture 202. The other lighting fixtures of the network 200 of lighting fixtures may also operate in a similar manner.

By controlling a light provided by a lighting fixture based on motion detection by a lighting fixture as well as based on received wireless input signals from other lighting fixtures or from a mobile device (e.g., BLE beacon signal from a smart phone), each lighting fixture of the network 200 can provide improved illumination by illuminating a path or a street ahead of a moving person/object.

In some example embodiments, the network 200 may include more or fewer lighting fixtures than shown in FIG. 2 without departing from the scope of this disclosure. In some example embodiments, different lighting fixtures of the network 200 may have different transmission ranges from each other without departing from the scope of this disclosure. In some example embodiments, different lighting fixtures of the network 200 may have different motion detection ranges from each other without departing from the scope of this disclosure. In some example embodiments, the areas of the transmission and motion detection shown in FIG. 2 may look different than shown without departing from the scope of this disclosure.

Figure 3:
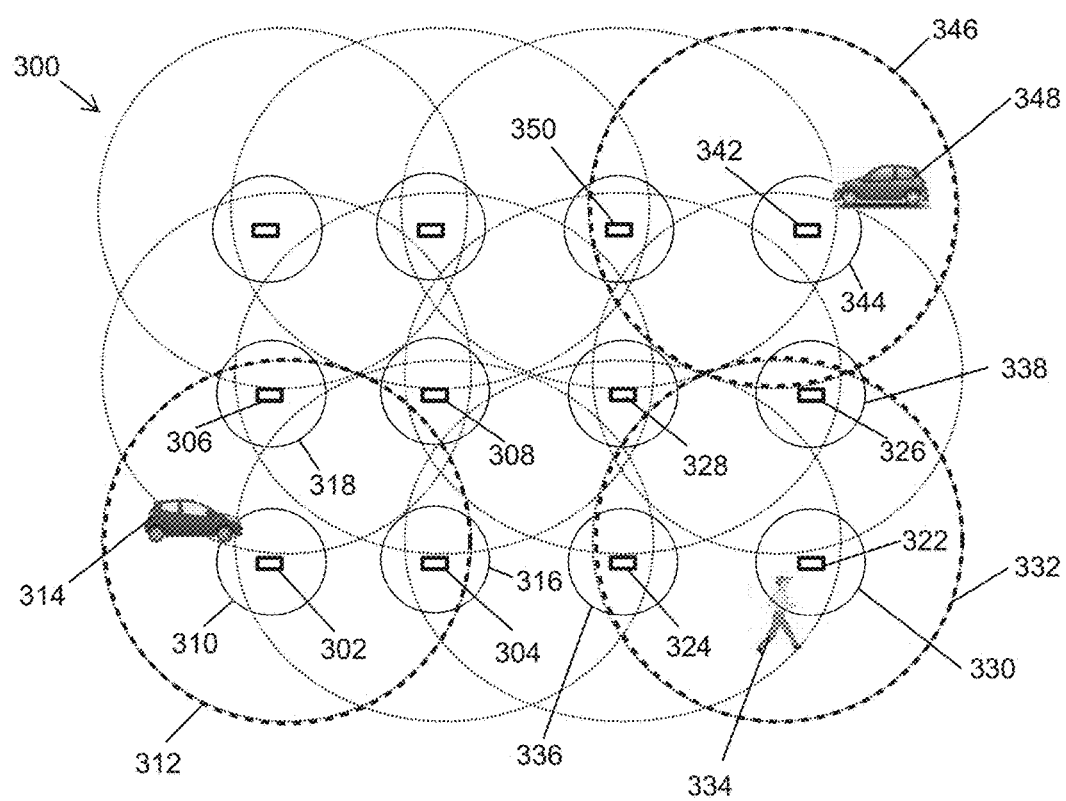
FIG. 3 illustrates a network of lighting fixtures according to another example embodiment.

FIG. 3 illustrates a network 300 of lighting fixtures according to another example embodiment. The network 300 includes lighting fixtures that each may be an instance of the lighting fixture 100 of FIG. 1. For example, each lighting fixture may be installed on a ceiling or a pole, for example, in a parking structure. In some example embodiments, the network 300 includes lighting fixtures 302-308. The network 300 may also include other lighting fixtures including lighting fixtures 322, 324, 326, 328, 344, 350. The lighting fixture 302 may have a motion detection coverage area generally within a boundary 310. The lighting fixture 304 may have a motion detection coverage area generally within a boundary 316. The lighting fixture 306 may have a motion detection coverage area generally within a boundary 318.

The lighting fixture 302 may transmit a wireless output signal (e.g., a Bluetooth or another RF signal) to indicate a detection of a motion by the motion sensor of the lighting fixture 302. For example, the lighting fixture 302 may transmit a wireless output signal when the car 314 enters the motion detection boundary 310 of the lighting fixture 302. The wireless signal may include an identification string (e.g., a network identifier) as described above. The wireless output signal transmitted by the lighting fixture 302 may have a range that is generally limited within the boundary 312. Because the lighting fixtures 304, 306 are within the range of the wireless signal transmitted by the lighting fixture 302, the lighting fixtures 304, 306 may receive the wireless signal and turn on or increase intensity of their respective lights in response. Because other lighting fixtures such as the lighting fixtures 308, 324 are outside of the range 312 of the wireless signal transmitted by the lighting fixture 302, the other lighting fixtures do not turn on their lights based on the wireless signal. The lighting fixtures 304, 306 may check whether the identification string a valid string before adjusting their lightings in response to the wireless signal. In some example embodiments, all lighting fixtures of the network 300 may include the same identification string when transmitting a respective wireless signal and may use the same identification string to check for validity of an identification string included in a received wireless signal before adjusting their respective lights.

In some example embodiments, the range 312 of the wireless signal transmitted by the lighting fixture 302 may be increased to include one or more of the other lighting fixtures such as the lighting fixtures 308, 324. In some example embodiments, the range 312 of the wireless signal transmitted by the lighting fixture 302 may be decreased such that one or both of the lighting fixtures 304, 306 do not turn on or increase their respective light based on the wireless signal transmitted by the lighting fixture 302.

The lighting fixtures 322, 324, 326, 328 may operate in a similar manner as the lighting fixture 302, where the lighting fixture 322 transmits a wireless signal that has a range 332 upon a detection of a motion (e.g., the motion of the person 334) by the motion sensor of the lighting fixture 322. The lighting fixtures 324, 326 may turn on their lights in response to receiving the wireless signal from the lighting fixture 322. Because the lighting fixture 328 is outside the reach of the wireless signal transmitted by the lighting fixture 322, the lighting fixture 328 does not change its light in response to the motion detection by the lighting fixture 322. The range 332 may be adjusted in a similar manner as described above to include more or fewer lighting fixtures with the range 332. The ranges of the wireless signals transmitted by the other lighting fixtures of the network 300 may also be adjusted in a similar manner.

The lighting fixture 344 may detect a motion of the car 348 and may transmit a wireless signal that has a range 346 to indicate the detection of the motion to lighting fixtures that are within the range 346. For example, because the lighting fixture 350 is the only lighting fixture within the range 346, the lighting fixture 350 may adjust its light in response to receiving the wireless signal, while other lighting fixtures of the network 300 do not adjust their lights.

In some example embodiments, the lighting fixtures of the network may each adjust their respective lights based on a BLE beacon signal (or another similar signal) provided by a mobile device in a similar manner as described with respect to FIG. 2. For example, the mobile device may be a device that is attached to the car 314 (inside or outside the car 314) or may be a built-in device that transmits a BLE beacon signal (or another similar signal) as described with respect to the mobile device 240 of FIG. 2. In some example embodiments, the driver of the car 314 may have a mobile device (e.g., a smart phone) that transmits a BLE beacon signal (or another similar signal) as described with respect to the mobile device 240 of FIG. 2. The lighting fixtures of the network 300 may respond to receiving a BLE beacon signal from a mobile device in the same manner as described with respect to FIG. 2. For example, the lighting fixture 302 may turn on, turn off, or adjust intensity of its light in response to receiving the BLE beacon signal from a mobile device. The other lighting fixtures of the network 300 of lighting fixtures may also operate in a similar manner.

By controlling a light provided by a lighting fixture based on motion detection by a lighting fixture as well as based on received wireless input signals from other lighting fixtures or from a mobile device (e.g., BLE beacon signal from a smart phone or a car attached or built-in device), each lighting fixture of the network 300 can provide improved illumination by illuminating a path or a street ahead of a moving person/object.

In some example embodiments, the network 300 may include more or fewer lighting fixtures than shown in FIG. 3 without departing from the scope of this disclosure. In some example embodiments, lighting fixtures of the network 300 may have different transmission ranges from each other without departing from the scope of this disclosure. In some example embodiments, lighting fixtures of the network 300 may have different motion detection ranges from each other without departing from the scope of this disclosure. In some example embodiments, the areas of the transmission and motion detection shown in FIG. 3 may look different than shown without departing from the scope of this disclosure.

Figure 4:
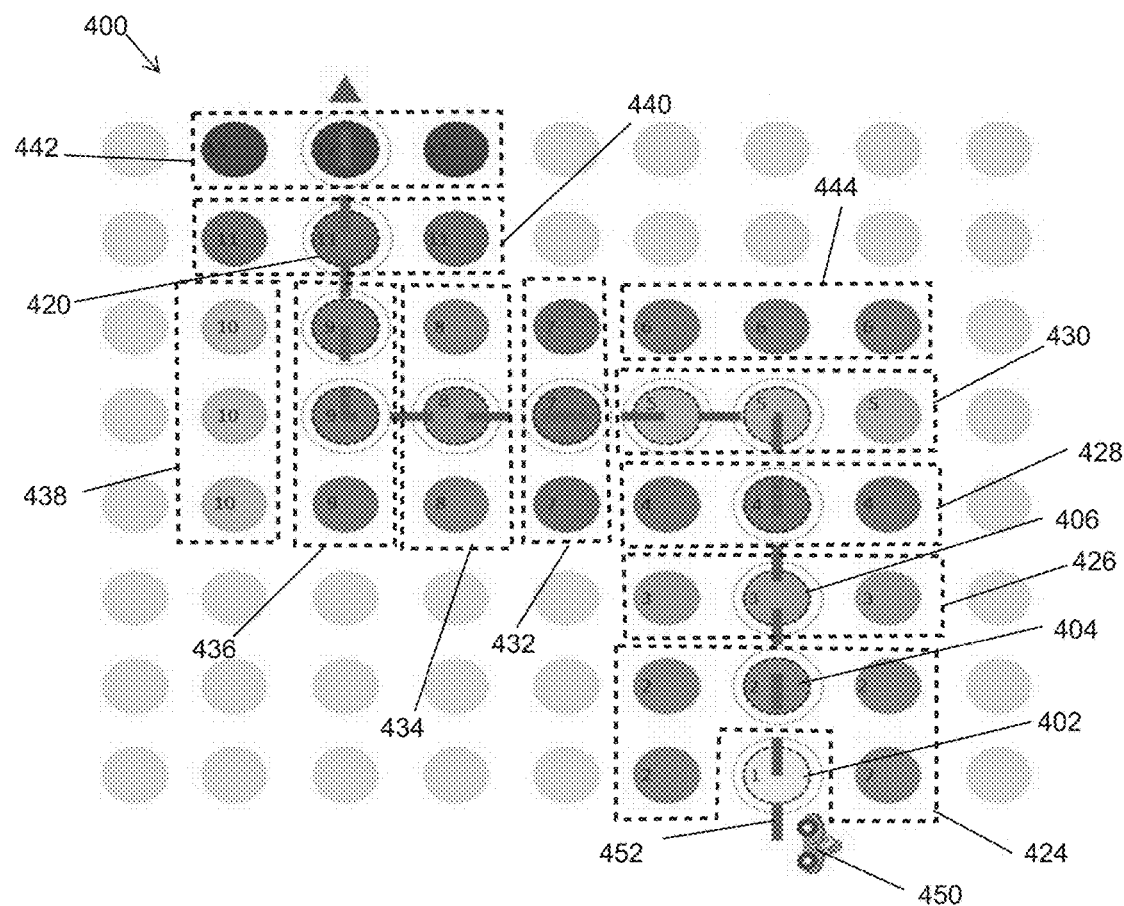
FIG. 4 illustrates a network of lighting fixtures according to another example embodiment.

FIG. 4 illustrates a network 400 of lighting fixtures according to another example embodiment. For example, the network 400 includes lighting fixtures that are in groups 424-444. Each lighting fixture of the network 400 may be an instance of the lighting fixture 100 of FIG. 1. In general, lighting fixtures that are in the same group are powered on in response to the same wireless signal. To illustrate, as a car 450 travels along a path 452 starting from a location shown in FIG. 4, a lighting fixture 402 detects the motion and transmits a wireless signal such that the lighting fixtures in the group 424 start emitting or increase intensity level of their lights, generally at the same time, in response to receiving the wireless signal. As the car 450 travels further and is detected by the motion sensor of the lighting fixture 404, the lighting fixture 404 may transmit a wireless signal such that the lighting fixtures in the group 426 respond, generally at the same time, by turning on or increasing the intensity level of their lights. As the car 450 travels further and is detected by the motion sensor of the lighting fixture 406, the lighting fixture 406 may transmit a wireless signal such that the lighting fixtures in the group 428 respond, generally at the same time, by turning on or increasing the intensity level of their lights. The network of lighting fixture can continue operating in a similar manner by illuminating the path 452 ahead of the car 450 to provide improved illumination.

In some example embodiments, a driver's mobile device or a transmitting device attached to or built in the car 450 (generally referred to herein as a mobile device) may transmit a wireless beacon signal, such as a BLE beacon signal, as the car 450 travels along the path 452. To illustrate, the lighting fixtures in the group 424 may, generally at the same time, turn on, adjust the intensity level of their lights, etc. in response to receiving a BLE beacon signal from the mobile device. As the car 450 continues to travel along the path 452, the lighting fixtures in the group 426 may, generally at the same time, turn on, adjust the intensity level of their lights, etc. in response to receiving a BLE beacon signal from the mobile device. The lighting fixtures in other groups of the network 400 may continue to respond in a similar manner as the car continues to travel along the path 452. In some example embodiments, the action taken by the lighting fixtures depends on the particular BLE beacon signal received by the lighting fixtures.

In some example embodiments, the network 400 may include fewer or more lighting fixtures and groups of lighting fixtures than shown in FIG. 4 without departing from the scope of this disclosure. In some alternative embodiments, the lighting fixtures of the network 400 may be grouped differently than shown without departing from the scope of this disclosure.

Figure 5:
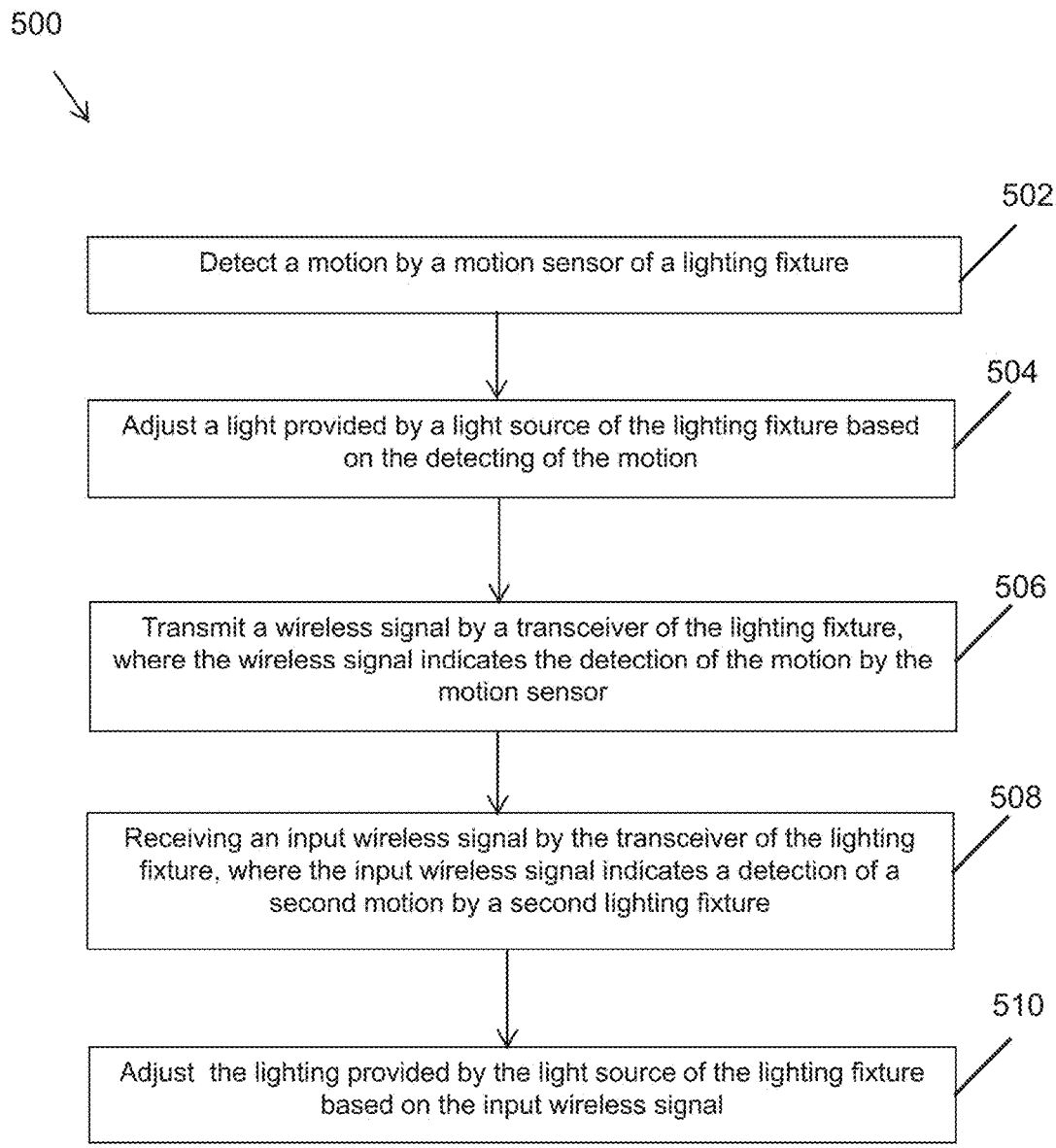
FIG. 5 illustrates method of controlling illumination based on motion detection according to an example embodiment.

FIG. 5 illustrates method 500 of controlling illumination based on motion detection according to an example embodiment. Referring to FIGS. 1-4, in some example embodiments, at step 502, the method 500 includes detecting a motion by a motion sensor of a lighting fixture. For example, the lighting fixture 100 of FIG. 1 may detect a motion of the person or a car. To illustrate, the lighting fixture 202 of FIG. 2 may detect a motion of the person 220 when the person 220 moves within the motion detection boundary 212 of the lighting fixture 202. As another example, the lighting fixture 302 of FIG. 3 may detect a motion of the car 314 when the car 314 moves within the motion detection boundary 310 of the lighting fixture 302.

At step 504, the method 500 includes adjusting a light provided by a light source of the lighting fixture based on the detecting of the motion. For example, based on the detecting of the motion, the lighting fixture 100 may adjust the light provide by the lighting fixture 100, the lighting fixture 202 may adjust the light provide by the lighting fixture 202, the lighting fixture 302 may adjust the light provide by the lighting fixture 302, and the lighting fixture 402 may adjust the light provide by the lighting fixture 402.

At step 506, the method 500 includes transmitting a wireless signal by a transceiver of the lighting fixture, where the wireless signal indicates the detection of the motion by the motion sensor. For example, the lighting fixture 100, 202, 302, 402 may each transmit a wireless signal indicating the detection of the motion by the motion sensor of the particular lighting fixture.

At step 508, the method 500 includes receiving an input wireless signal by the transceiver of the lighting fixture, where the input wireless signal indicates a detection of a second motion by a second lighting fixture. For example, each lighting fixture 202, 302, 402 may receive a wireless signal indicating the detection of the motion by the motion sensor of the lighting fixture 204, 304, 404, respectively. At step 510, the method 500 includes adjusting the lighting provided by the light source of the lighting fixture based on the input wireless signal. For example, each lighting fixture 202, 302, 402 may adjust (e.g., increase intensity, turn on, etc.) of its light in response to the input wireless signal.

In some example embodiments, the method 500 may include determining whether the input wireless signal includes a valid identification string. For example, the lighting fixture (e.g., the lighting fixture 202, 302, 402) may adjust the lighting provided by the light source of the lighting fixture based on the input wireless signal in response to determining that the input wireless signal includes a valid identification string, such as network identification, lighting fixture identification, etc.

The method 500 may also include adjusting a range of the wireless signal transmitted by the transceiver of the lighting fixture by adjusting a power level of the wireless signal. For example, the lighting fixture 202 may increase the power for transmitting the wireless signal 232, where one or more additional lighting fixtures (e.g., the lighting fixture 206) also receive the wireless signal 232 that may indicate motion detection by the lighting fixture 202.

In some example embodiments, the method 500 may also include changing an identification string included in the wireless signal transmitted by the transceiver of the lighting fixture before transmitting the wireless signal. For example, the identification string may be changed after adding a new lighting fixture to the network and the existing identification string is unknown to the installer.

Although a particular order of steps is shown in FIG. 5, in some alternative embodiments, the method 500 may be performed in a different order without departing from the scope of this disclosure. In some alternative embodiments, one or more of the steps of the method 500 may be omitted or other steps may be added without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting fixture, comprising:
a lighting device;
a motion sensor;
a transceiver configured to transmit and receive wireless signals; and
a controller communicably coupled to the lighting device, to the motion sensor, and to the transceiver, wherein the controller is configured to adjust a light provided by the lighting device based on a motion detection by the motion sensor and based on a wireless input signal received by the transceiver indicating whether a second motion is detected by a second lighting fixture, wherein the wireless input signal includes an identification string associated with the second lighting fixture, and wherein the wireless input signal is a radiofrequency wireless input signal, and wherein the controller is configured to determine whether the identification string is a valid identification string and to control the lighting device based on the wireless input signal if the identification string is the valid identification string.

2. The lighting fixture of claim 1, wherein the lighting fixture is configured to transmit a wireless output signal indicating the motion detection by the motion sensor.

3. The lighting fixture of claim 2, wherein the wireless output signal includes a second identification string for use by a receiving lighting fixture to determine whether to adjust a light emitted by the receiving lighting fixture based on the wireless output signal.

4. The lighting fixture of claim 1, wherein a power level of the wireless output signal is adjustable based on a user input to increase a number of lighting fixtures that receive the wireless output signal.

5. The lighting fixture of claim 1, wherein a power level of the wireless output signal is adjustable based on a user input to reduce a number of lighting fixtures that receive the wireless output signal.

6. The lighting fixture of claim 1, wherein adjusting the light provided by the lighting device includes turning on the light.

7. The lighting fixture of claim 1, wherein adjusting the light provided by the lighting device includes increasing an intensity level of the light.

8. The lighting fixture of claim 1, wherein the controller is further configured to adjust the light provided by the lighting device based on a Bluetooth Low Energy beacon signal provided by a mobile device.

9. A lighting network, comprising:
a first lighting fixture comprising a motion sensor, the first lighting fixture configured to:
start emitting a first light or change an intensity level of the first light in response to a detection of a motion; and
transmit a wireless signal indicating the detection of the motion by the first lighting fixture, wherein the wireless signal is a radiofrequency wireless signal;
a second lighting fixture located inside a range of the wireless signal, wherein the second lighting fixture is configured to receive the wireless signal transmitted by the first lighting fixture and to start emitting a second light or change an intensity level of the second light based on the wireless signal; and
a third lighting fixture located inside the range of the wireless signal transmitted by the first lighting fixture and wherein the third lighting fixture is configured to receive the wireless signal transmitted by the first lighting fixture and to start emitting a third light or change an intensity level of the third light based on the wireless signal.

10. The lighting network of claim 9, further comprising a third lighting fixture located outside a range of the wireless signal transmitted by the first lighting fixture and inside a range of a second wireless signal transmitted by the second lighting fixture, wherein the second wireless signal indicates a second motion detection by a motion sensor of the second lighting fixture and wherein the third lighting fixture is configured to start emitting a third light or change an intensity level of the third light in response to receiving the second wireless signal.

11. The lighting network of claim 10, wherein the second lighting fixture is configured to determine whether the wireless signal includes a valid identification string before changing the intensity level of the second light in response to receiving the wireless signal.

12. The lighting network of claim 10, wherein the third lighting fixture is configured to determine whether the second wireless signal includes a valid identification string before starting to emit the third light and before changing the intensity level of the third light based on receiving the second wireless signal.

13. The lighting network of claim 9, wherein the range of the wireless signal is adjustable by adjusting a power level of the wireless signal.

14. A method of controlling lighting, the method comprising:
detecting a motion by a motion sensor of a lighting fixture;
receiving an input wireless signal by the lighting fixture;
transmitting, by the lighting fixture, an output wireless signal indicating a detection of the motion by the motion sensor of the lighting fixture, wherein the output wireless signal includes a first identification string associated with the lighting fixture; and
adjusting, by the lighting fixture, a light provided by the lighting fixture based on the detecting of the motion by the motion sensor of the lighting fixture and the input wireless signal, wherein the input wireless signal includes a second identification string associated with a second lighting fixture, and wherein the input wireless signal and the output wireless signal are radiofrequency wireless signals, wherein the lighting fixture adjusts the light provided by the lighting fixture based on the wireless input signal if the second identification string is a valid identification string.

15. The method of claim 14, further comprising adjusting a range of the wireless output signal by adjusting a power level of the wireless output signal.

16. The method of claim 14, further comprising determining whether the input wireless signal includes a valid identification string before adjusting the light provided by the lighting fixture based on the input wireless signal.

17. The method of claim 14, wherein the input wireless signal is a Bluetooth Low Energy beacon signal received from a mobile device.

* * * * *